United States Patent
Sasaki et al.

(10) Patent No.: US 12,276,085 B2
(45) Date of Patent: Apr. 15, 2025

(54) WORK ASSIST SERVER, WORK ASSIST METHOD, AND WORK ASSIST SYSTEM

(71) Applicant: KOBELCO CONSTRUCTION MACHINERY CO., LTD., Hiroshima (JP)

(72) Inventors: Hitoshi Sasaki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 399 days.

(21) Appl. No.: 17/780,795

(22) PCT Filed: Oct. 8, 2020

(86) PCT No.: PCT/JP2020/038203
§ 371 (c)(1),
(2) Date: May 27, 2022

(87) PCT Pub. No.: WO2021/124654
PCT Pub. Date: Jun. 24, 2021

(65) Prior Publication Data
US 2022/0412048 A1 Dec. 29, 2022

(30) Foreign Application Priority Data

Dec. 18, 2019 (JP) .................................. 2019-228634

(51) Int. Cl.
*E02F 9/20* (2006.01)
*G05D 1/00* (2024.01)
*G08C 17/02* (2006.01)

(52) U.S. Cl.
CPC ........... *E02F 9/205* (2013.01); *G05D 1/0033* (2013.01); *G08C 17/02* (2013.01)

(58) Field of Classification Search
CPC ......... E02F 9/205; E02F 9/2054; E02F 9/264; G05D 1/0033; G08C 17/02; G08C 17/00; H04N 7/18
See application file for complete search history.

(56) References Cited

U.S. PATENT DOCUMENTS 11,180,903 B2    11/2021   Hashimoto
2009/0027500 A1*  1/2009   Elangovan ........... H04N 5/2723
                                                348/E7.001
(Continued)

FOREIGN PATENT DOCUMENTS

JP    2005-242830 A    9/2005
JP    2019-039278 A    3/2019
(Continued)

OTHER PUBLICATIONS

The extended European search report dated Nov. 24, 2022 issued in the corresponding EP Patent Application No. 20903456.0.

*Primary Examiner* — Cao H Nguyen
(74) *Attorney, Agent, or Firm* — Carrier, Shende & Associates P.C.; Fulchand P. Shende; Joseph P. Carrier

(57) ABSTRACT

Provided is a server and a system that can assist an operator in recognizing whether or not a work machine in a work-site birds-eye image output on an output interface constituting a remote operation device is subject to remote operation by the remote operation device. According to the captured image acquired through the image pickup device C, when a work machine 40 is in the work-site birds-eye image that is output on an output interface 220 constituting a remote operation device 20, whether or not the work machine 40 is a connection-target work machine is determined. If the determination result is positive, a first sign image ID1 associated with an actual machine image Q2 that represents the work machine 40 in the work-site birds-eye image is (Continued)

displayed on the output interface 220 of the remote operation device 20.

8 Claims, 10 Drawing Sheets

(56) References Cited

U.S. PATENT DOCUMENTS

2011/0299730 A1* 12/2011 Elinas .................. G06T 7/73
    382/103
2018/0371723 A1* 12/2018 Nishi ................ G05D 1/0094

FOREIGN PATENT DOCUMENTS

| WO | 2016/017367 A1 | 2/2016 |
| WO | 2016/208276 A1 | 12/2016 |
| WO | 2019/172424 A1 | 9/2019 |

* cited by examiner

WORK ASSIST SERVER, WORK ASSIST METHOD, AND WORK ASSIST SYSTEM

TECHNICAL FIELD

The present invention relates to a work assist server for assisting work machine remote operation by operators using remote operation devices.

BACKGROUND ART

A terminal device for a remote monitoring assist system has been proposed for sharing information with sufficient accuracy between workers who are patrolling and inspecting a plant and those who are waiting outside the work site (see, for example, Patent Literature 1). This terminal device comprises a video input unit configured to input video data from the site, a pen or mouse type input operation selection unit, a detection unit configured to detect whether a new video has been acquired or not, a communication control unit configured to wirelessly transmit and receive data to and from external devices, and an input/output screen display unit configured to display an entry screen for entering predetermined data.

CITATION LIST

Patent Literature

Patent Literature 1: Japanese Patent Laid-Open No. 2005-242830

SUMMARY OF INVENTION

Technical Problem

However, when an image captured through an image pickup device is displayed on an output interface (image display device) that constitutes a remote operation device, and multiple work machines are in the image, the operator may mistakenly believe that another work machine different from the actual one in the displayed image is to be operated. This is particularly noticeable when multiple work machines of the same model of the same manufacturer are simultaneously displayed on the output interface. In this case, the motion mode of the work machine using the remote operation device based on the operator's misidentification may become inappropriate to execute the target work.

An object of the present invention is to provide a server and a system that can assist an operator in recognizing whether or not a work machine in a work-site birds-eye image output on an output interface constituting a remote operation device is subject to remote operation by the remote operation device.

Solution to Problem

The present invention relates to a work assist server for assisting work machine remote operation by operators using remote operation devices.

A work assist server of the present invention comprises: a first assist processing element that causes an output interface of the remote operation device to output, based on communication with the remote operation device, a work-site birds-eye image according to an image captured at a worksite acquired through an image pickup device, recognizes a real spatial position of a connection-target work machine as the work machine to be subject to operation through the remote operation device, and when a work machine is in the work-site birds-eye image, determines whether or not the work machine is the connection-target work machine based on the position of the work machine in an image coordinate system and the real spatial position of the connection-target work machine; and a second assist processing element that causes the output interface of the remote operation device to output, based on communication with the remote operation device, a first sign image showing that the work machine in the work-site birds-eye image is the connection-target work machine when the first assist processing element determines that the work machine is the connection-target work machine.

The work assist system of the present invention includes a work assist server of the present invention and the remote operation device.

In a work assist server and work assist system with this configuration (hereinafter referred to as "work assist server and the like" as appropriate), when a work machine is in a work-site birds-eye image that is output on an output interface constituting a remote operation device according to the image captured by an image pickup device, whether or not the work machine is a connection-target work machine is determined. The "connection-target work machine" refers to the work machine to be actually remotely operated by the remote operation device. The "work-site bird's-eye image" is a concept that includes at least a part of the captured image itself as well as a pseudo-image generated based on the captured image to represent the work site in a pseudo manner. When the determination result is positive, the work machine in the work-site birds-eye image is associated with the connection-target work machine, and a first sign image is displayed on the output interface of the remote operation device.

As a result, the operator can easily recognize whether or not the work machine in the work-site bird's-eye image is subject to remote operation by the remote operation device. Thus, for example, even when multiple work machines are in the work-site birds-eye image, the operator can easily recognize which of the multiple work machines is the connection-target work machine or which of the multiple work machines is not the connection-target work machine.

DESCRIPTION OF EMBODIMENTS (Configuration of Work Assist System)

Figure 1:
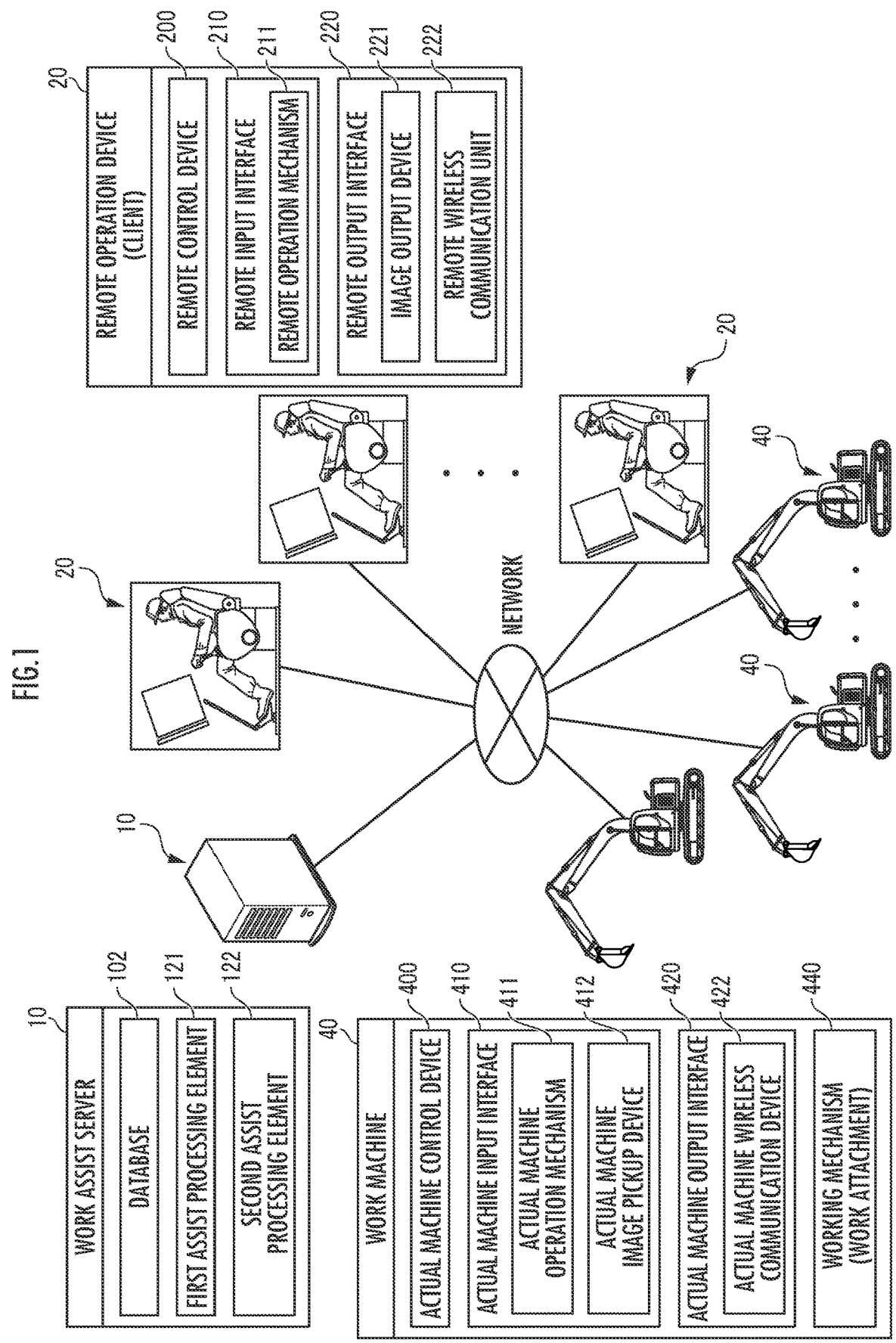
FIG. 1 is an illustration of the configuration of a work assist system as an embodiment of the present invention.

The work assist system as one embodiment of the present invention shown in FIG. 1 includes a work assist server 10, multiple remote operation devices 20 for remotely operate multiple work machines 40. The work assist server 10, remote operation devices 20, and work machines 40 are configured to be able to communicate with each other through a network. The multiple remote operation devices 20 may be configured to be able to communicate with each other through a network different from the network for communication with the work assist server 10.

(Configuration of Work Assist Server)

The work assist server 10 comprises a database 102, a first assist processing element 121, and a second assist processing element 122. The database 102 stores and maintains the position trajectories of the multiple work machines 40, as well as captured images, work-site birds-eye images, route guide images and the like. The database 102 may be a database server separate from the work assist server 10. Each assist processing element is composed of an arithmetic processing device (single-core processor or multi-core processor, or processor core constituting it), reads necessary data and software from a memory or other storage devices, and performs the arithmetic computations described below according to the software on the data.

(Configuration of Remote Operation Device)

The remote operation device 20, which constitutes a client, comprises a remote control device 200, a remote input interface 210, and a remote output interface 220. The remote control device 200 is an arithmetic processing device (single-core processor or multi-core processor, or processor core constituting it), reads necessary data and software from a memory or other storage devices, and performs the arithmetic computations according to the software on the data. The remote input interface 210 comprises a remote operation mechanism 211. The remote output interface 220 comprises an image output device 221 and a remote wireless communication unit 222.

The client may be a mobile device such as a smartphone or tablet computer, or a wearable device such as VR goggles, that can connect to or has the function of intercommunicating with the remote operation device 20. The mobile device or wearable device may have the function of communicating with the work assist server 10.

The remote operation mechanism 211 includes a traveling operation device, a turning operation device, a boom operation device, an arm operation device, and a bucket operation device. Each operation device has operation levers that are subject to rotary operation. The operation levers of the traveling operation device (traveling levers) are operated to move a lower traveling body 41 of the work machine 40. The traveling levers may also serve as traveling pedals. For example, traveling pedals may be fixed to the base or lower end of the traveling levers. The operation lever of the turning operation device (turning lever) is operated to move the hydraulic turning motor that constitutes a turning mechanism 43 of the work machine 40. The operation lever (boom lever) of the boom operation device is operated to move the boom cylinder 442 of the work machine 40. The operation lever of the arm operation device (arm lever) is operated to move the arm cylinder 444 of the work machine 40. The operation lever (bucket lever) of the bucket operation device is operated to move the bucket cylinder 446 of the work machine 40.

Figure 2:
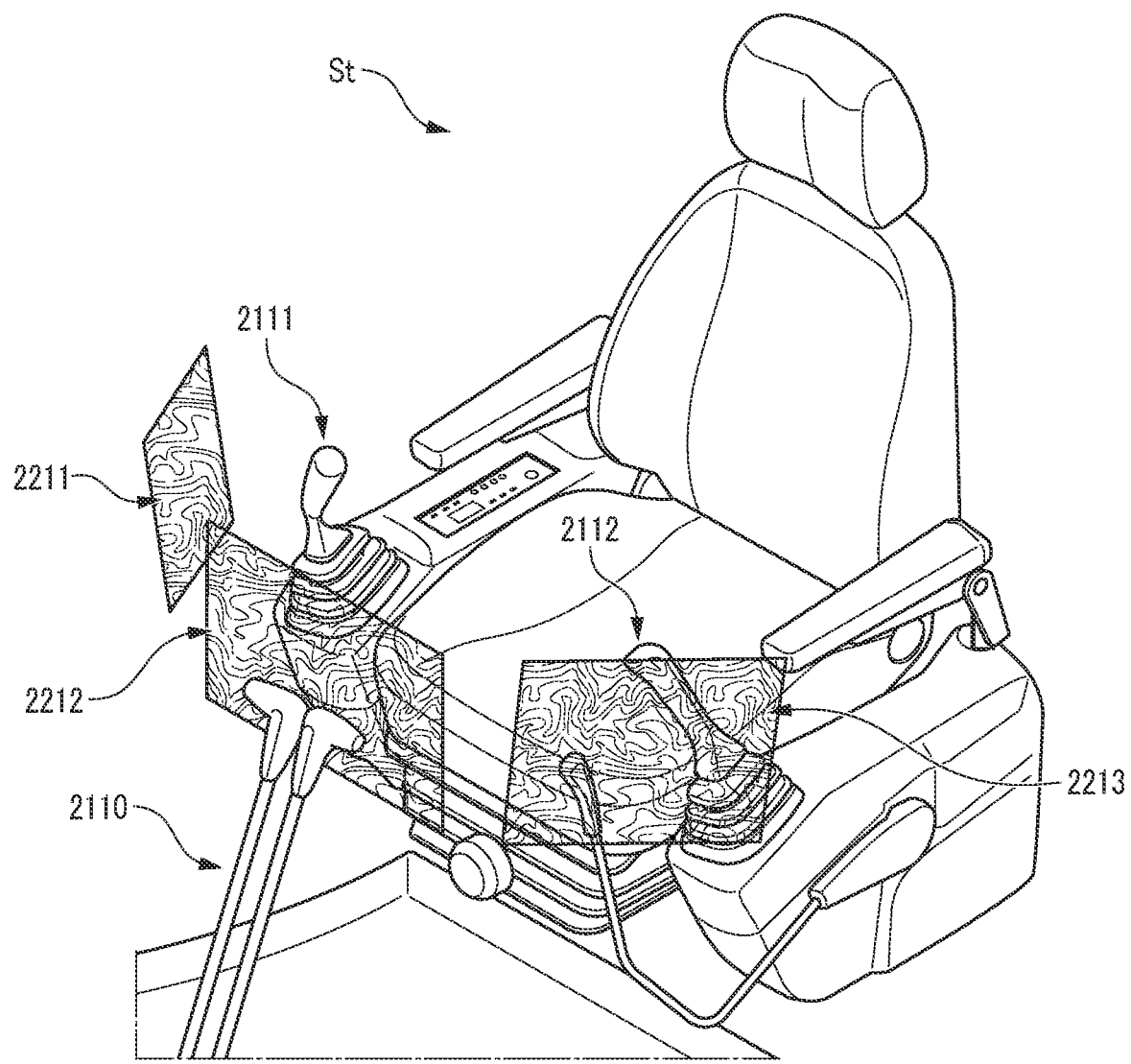
FIG. 2 is an illustration of the configuration of a remote operation device.

Each of the operation levers constituting the remote operation mechanism 211 is located, for example, around a seat St for the operator to sit on, as shown in FIG. 2. The seat St is in the form of a high-back chair with armrests, but can also be a low-back chair without a headrest, a chair without a backrest, or any other forms that a remote operator OP2 can sit on.

A pair of left and right traveling levers 2110 corresponding to the left and right crawlers are arranged side by side in front of the seat St. One operation lever may serve as multiple operation levers. For example, the right operation lever 2111 in front of the right frame of the seat St shown in FIG. 2 may function as a boom lever when operated in the forward/backward direction and as a bucket lever when operated in the left/right direction. Similarly, the left operation lever 2112, located in front of the left frame of the seat St shown in FIG. 2 may function as an arm lever when operated in the forward/backward direction and as a turning lever when operated in the left/right direction. The lever pattern may be changed as desired by the operator's operational instructions.

The image output device 221 consists of a right diagonally front image output device 2211, a front image output device 2212, and a left diagonally front image output device 2213 which are located, for example, diagonally in front and to the right of, in front of, and diagonally in front and to the left of the seat St, respectively, as shown in FIG. 2. The image output devices 2211 to 2213 may further comprise a speaker (audio output device).

(Configuration of Work Machine)

The work machine 40 comprises an actual machine control device 400, an actual machine input interface 410, an actual machine output interface 420, and a working mechanism 440. The actual machine control device 400 is an arithmetic processing device (single-core processor or multi-core processor, or processor core constituting it), reads necessary data and software from a storage device, such as a memory, and performs arithmetic computations on the data according to the software.

Figure 3:
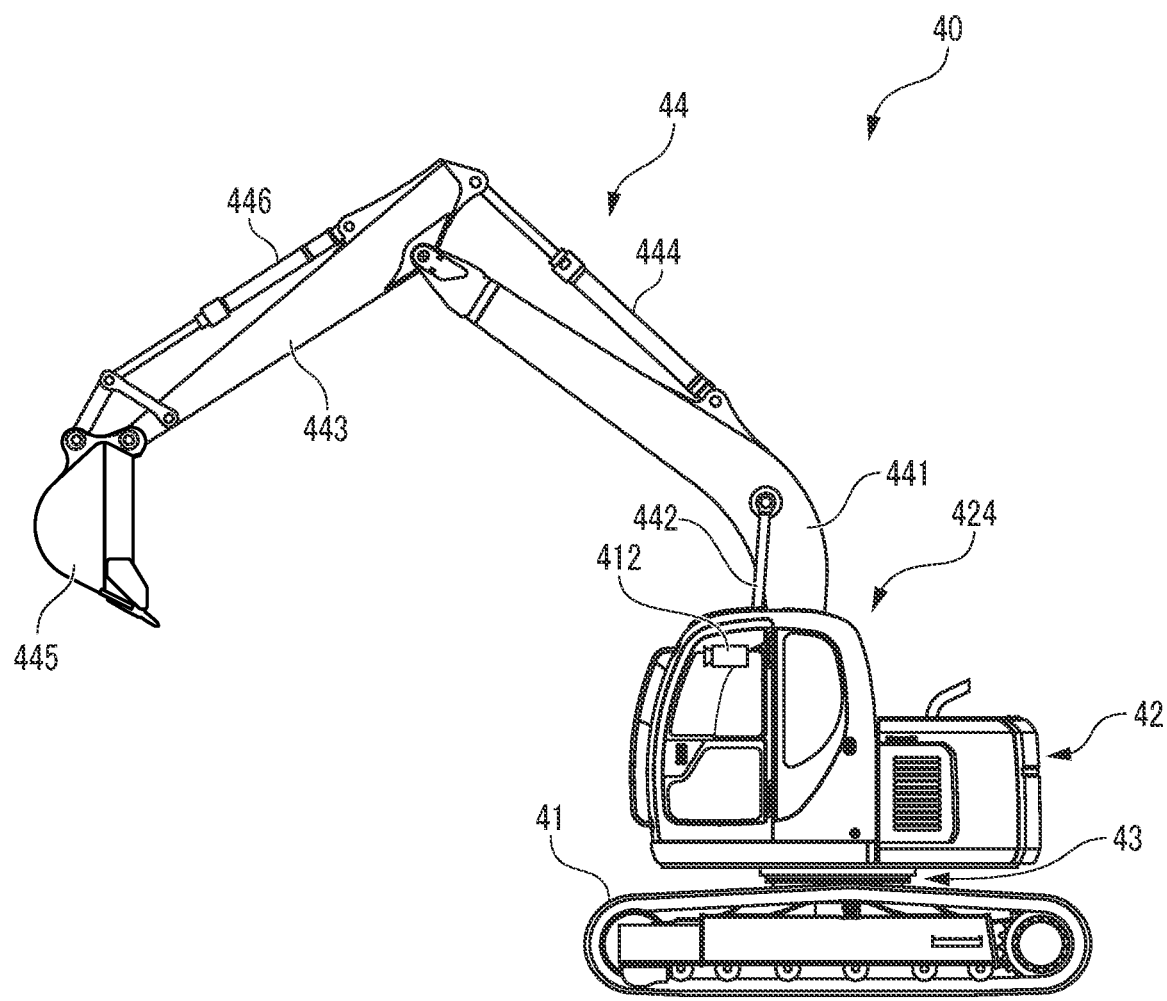
FIG. 3 is an illustration of the configuration of a work machine.

The work machine 40 is, for example, a crawler excavator (heavy construction equipment) and, as shown in FIG. 3, comprises a crawler-type lower traveling body 41, and an upper turning body 42 mounted on the lower traveling body 41 via the turning mechanism 43 so that it can turn. A cab (operator's cab) 424 is provided in front to the left of the upper turning body 42. A work attachment 44 is provided in front center of the upper turning body 42.

The actual machine input interface 410 comprises an actual machine operation mechanism 411 and an actual machine image pickup device 412. The actual machine operation mechanism 411 comprises multiple operation levers located around the seat inside the cab 424 in the same manner as in the remote operation mechanism 211. A drive mechanism or robot is provided in the cab 424 to receive signals in response to the manner of operation of the remote operation levers and move the actual machine operation levers according to the received signals. The actual machine image pickup device 412 is installed, for example, inside the cab 424, and captures an environment, including at least a part of the working mechanism 440, through the front window of the cab 424.

The actual machine output interface 420 comprises an actual machine wireless communication device 422.

The work attachment 44 as a working mechanism comprises a boom 441 mounted on the upper turning body 42 so as to be movable up and down, an arm 443 pivotably coupled to the end of the boom 441, and a bucket 445 pivotably coupled to the end of the arm 443. The work attachment 44 has a boom cylinder 442, an arm cylinder 444, and a bucket cylinder 446, which is an extendable hydraulic cylinder.

The boom cylinder 442 is interposed between the boom 441 and the upper turning body 42 so as to extend and contract with supplied hydraulic fluid to rotate the boom 441 in the up-and-down direction. The arm cylinder 444 is interposed between the arm 443 and the boom 441 so as to extend and contract with supplied hydraulic fluid to rotate the arm 443 about a horizontal shaft with respect to the boom 441. The bucket cylinder 446 is interposed between the bucket 445 and the arm 443 so as to extend and contract with supplied hydraulic fluid to rotate the bucket 445 about a horizontal shaft with respect to the arm 443.

(Function)

The functions of the work assist system with the aforementioned configuration will be explained using the flowcharts shown in FIGS. 4 and 5. In the flowcharts, the block "Cn" is used to simplify description, means transmission and/or reception of data and means a conditional branch in which processing in a branch direction is executed on condition of transmission and/or reception of the data.

"Recognizing" information by any of the components (computing and processing resources or hardware resources) is a concept that includes processes for preparing the information in all forms that can be used in succeeding processes, such as receiving the information, reading out or searching for the information from or in a storage device or the like, writing the information into (causing the information to be stored and held in) a storage device or the like or registering the information with the storage device or the like, and performing estimation, judgment, identification, measurement, prediction and the like of the information by executing arithmetic processing of an output signal from a sensor and/or received or retrieved basic information according to a predetermined algorithm.

(First Function (Remote Operation of Work Machine))

Figure 4:
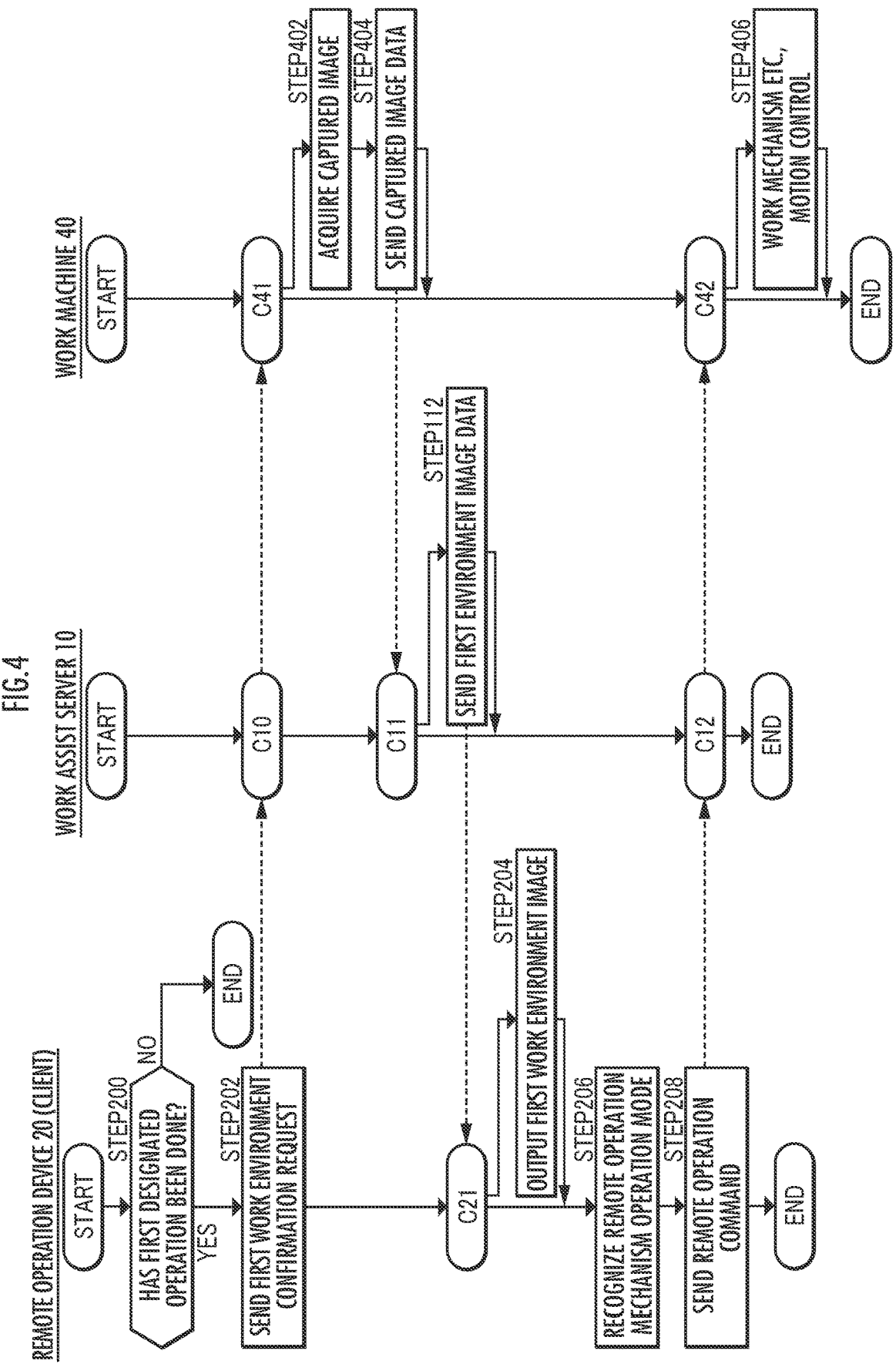
FIG. 4 is an illustration of a first function of the work assist system.
Figure 7:
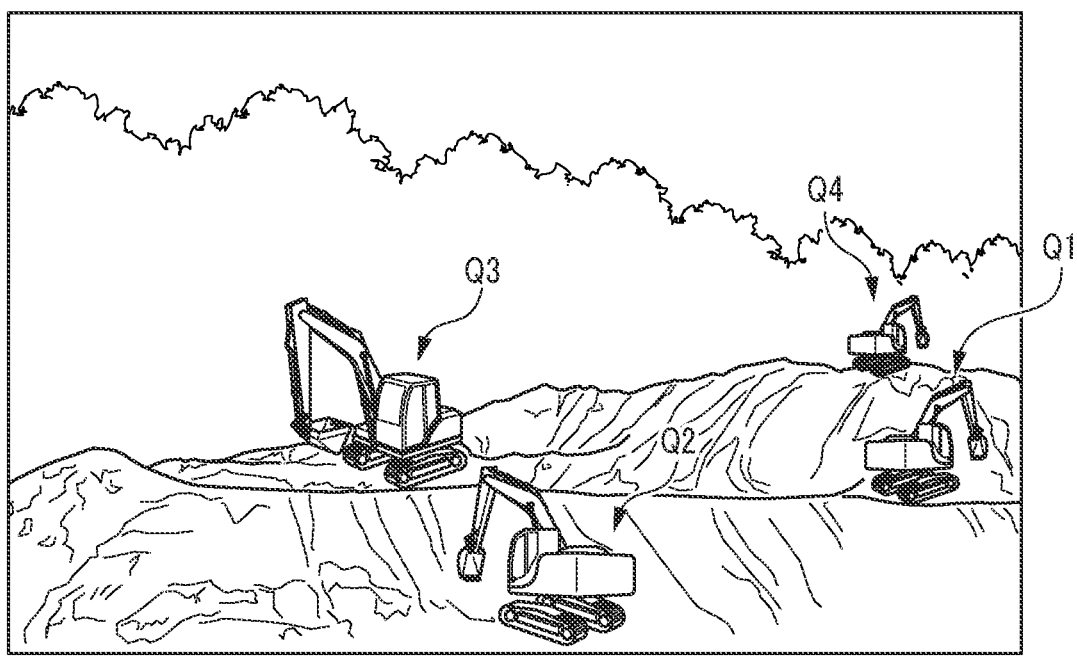
FIG. 7 is an illustration of a work-site bird's-eye image.

With the remote operation device 20, it is determined whether or not a first designated operation has been made through the remote input interface 210 by the operator (FIG. 4/STEP 200). The first designated operation is an operation to select the work machine 40 to be connected to the remote operation device 20, for example, an operation such as tapping, swiping, or clicking on the work-site birds-eye image (see FIG. 7) on the touch panel that constitutes the remote input interface 210 made by the operator. In FIG. 7, actual machine images Q1 to Q4 of multiple (four) work machines 40 that can be subject to remote operation are displayed, and whether or not an operation has been performed on any of the positions of the actual machine images displayed on the touch panel is determined. The remote operation device 20 may acquire candidate heavy construction equipment that can be subject to remote operation by the remote operation device 20 via the communication network, and display various types of information such as the position, model, and operating status of the heavy construction equipment with the identifier of the heavy construction equipment on the remote output interface 220. If the determination result is negative, such as when the first designated operation is interrupted (FIG. 4/STEP 200, NO), the series of processing ends. In contrast, if the determination result is positive (FIG. 4/STEP 200, YES), a first work environment confirmation request is sent to the work assist server 10 through the remote wireless communication unit 222 to request for the captured images needed to operate the work machine 40 to be connected to the remote operation device 20 (FIG. 4/STEP 202). The first work environment image request includes at least one of the identifier of the remote operation device 20 and the identifier of the operator.

When the work assist server 10 receives the first work environment confirmation request, the first assist processing element 121 sends the first work environment image request to the corresponding work machine 40 (FIG. 4/C10).

When the work machine 40 receives the first work environment confirmation request through the actual machine wireless communication device 422 (FIG. 4/C41), the actual machine control device 400 obtains the image captured through the actual machine image pickup device 412 (FIG. 4/STEP 402). The actual machine control device 400 sends captured image data representing the captured image, through the actual machine wireless communication device 422 to the work assist server 10 (FIG. 4/STEP 404).

When the work assist server 10 receives the captured image data (FIG. 4/C11), first work environment image data (data representing all or part of the captured image itself or a simulated first work environment image generated based on it) related to the captured image data is sent to the remote operation device 20 (FIG. 4/STEP 112). Data representing the work-site birds-eye image (see FIG. 7), which will be described below, may be sent to the remote operation device 20 as the first work environment image data.

When the remote operation device 20 receives the first work environment image data through the remote wireless communication unit 222 (FIG. 4/C21), a first work environment image related to the first work environment image data is output to the image output device 221 (FIG. 4/STEP 204).

Figure 6:
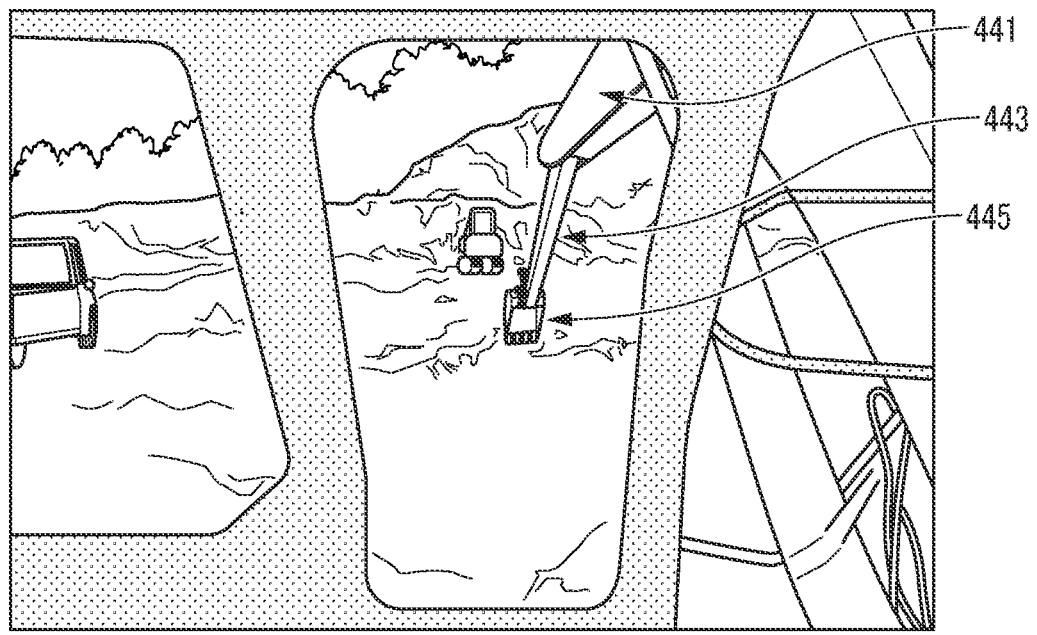
FIG. 6 is an illustration of a first work environment image.

Hence, as shown in FIG. 6, for example, the work-site birds-eye image that includes the boom 441, arm 443, bucket 445, and arm cylinder 444 which are a part of the work attachment 44 as the working mechanism captured by the actual machine image pickup device 412 mounted on the work machine 40 to be connected to the remote operation device 20 is displayed on the image output device 221.

In the remote operation device 20, the remote control device 200 recognizes an operation mode of the remote operation mechanism 211 (FIG. 4/STEP 206), and a remote operation command suitable for the operation mode is sent to the work assist server 10 through the remote wireless communication unit 222 (FIG. 4/STEP 208).

When the work assist server 10 receives the remote operation command, the first assist processing element 121 sends the remote operation command to the work machine 40 (FIG. 4/C12).

When, in the work machine 40, the actual machine control device 400 receives an operation command through the actual machine wireless communication device 422 (FIG. 4/C42), the motion of the work attachment 44 and the like is controlled (FIG. 4/STEP 406). For example, the bucket 445 is used to scoop soil in front of the work machine 40, and the upper turning body 42 is turned and the soil is dropped from the bucket 445.

(Second Function (Sign Image Output))

Figure 5:
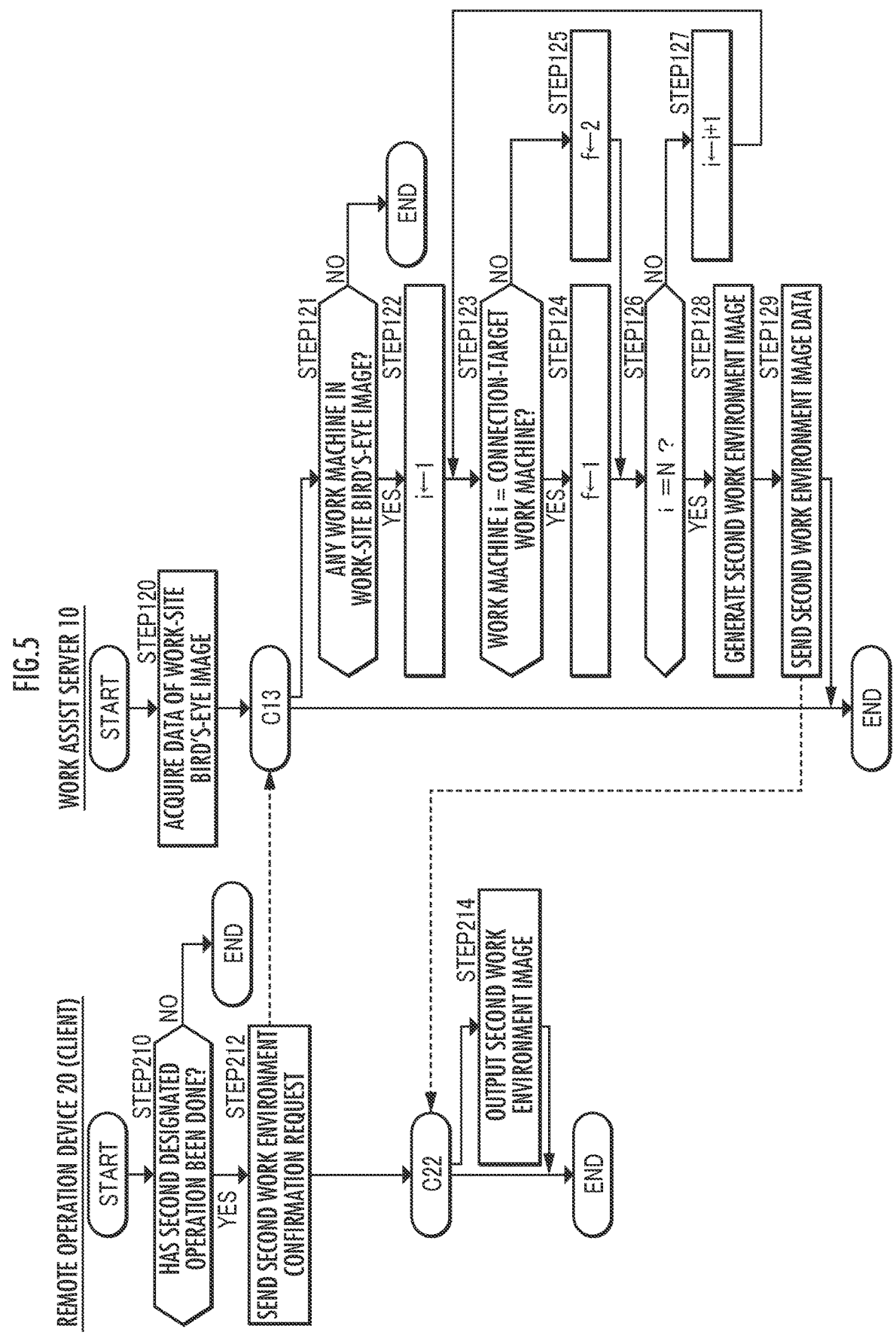
FIG. 5 is an illustration of a second function of the work assist system.

In the work assist server, the birds-eye view work environment representing the birds-eye view of the work site (or data representing the same) is acquired based on the captured image acquired through an image pickup device (not shown in the drawing) installed at the work site or the actual machine image pickup device 412 mounted on a work machine 40 that is not connected to the remote operation device 20 (FIG. 5/STEP 120). Accordingly, based on the captured image acquired through the image pickup device C (see FIG. 10) installed at the work site, for example, as shown in FIG. 7, data representing an image of the work site including the actual machine images Q1 to Q4 of the multiple (four) work machines 40 is acquired as data representing a work-site bird's-eye image.

In the remote operation device 20 (first client), whether or not the second designated operation has been made through the remote input interface 210 by the operator is determined (FIG. 5/STEP 210). The second designated operation is an operation to allow a work-site bird's-eye image that is different from the first work environment image displayed on the image output device 221 upon the first designated operation to be displayed on the image output device 221, and is, for example, an operation such as tapping through the remote input interface 210 or operating the remote operation mechanism 211. Not a first work environment image but the work-site birds-eye image may be output to the image output device 221 in response to the first designated operation (see FIG. 4/STEP 200), and a first work environment image may be output to the image output device 221 in response to the second designated operation (see FIG. 5/STEP 210). Different second work environment images may be output to the image output device 221 in response to the first designated operation and the second designated operation, respectively.

If the determination result is negative, such as when the second designated operation is interrupted (FIG. 5/STEP 210, NO), the series of processing ends. If the determination result is positive (FIG. 5/STEP 210, YES), a second work environment request is sent to the work assist server 10 through the remote wireless communication unit 222 (FIG. 5/STEP 212). The second work environment request includes the identifier of the corresponding remote operation device 20 or the work machine 40 connected to it.

When the work assist server 10 receives the second work environment confirmation request (FIG. 5/C13), the first assist processing element 121 determines whether or not any work machine 40 is in the work-site birds-eye image on the output interface 220 of the remote operation device 20 (FIG. 5/STEP 121). To be specific, the first assist processing element 121 performs image analysis processing on the work-site birds-eye image to determine whether or not there is the actual machine image Qi (i=1, 2, ..., N) representing the work machine 40 in the work-site birds-eye image.

If the determination result is positive (FIG. 5/STEP 121, YES), the index i for distinguishing the actual machine image Qi is set to "1" (FIG. 5/STEP 122).

After that, the first assist processing element 121 determines whether or not the actual machine image Qi corresponds to a connection-target work machine (FIG. 5/STEP 123). To be specific, whether or not the real spatial position of the work machine 40 corresponding to the actual machine image Qi matches or corresponds to the real spatial position of the connection-target work machine registered to the database 102 is determined.

For example, the position (e.g., the position of the center of gravity) of the actual machine image Qi in the image coordinate system is transformed into a real spatial coordinate system to determine the real spatial position of the work machine 40 corresponding to the actual machine image Qi. In this case, based on the size of the actual machine image Qi in the work-site birds-eye image, the real spatial distance from the image pickup device (e.g., the image pickup device C (see FIG. 10)) to the work machine 40 is estimated. When the distance to the object to be imaged, which is acquired by a distance measurement sensor such as TOF sensor, is included as a pixel value in the work-site bird's-eye image, the real spatial distance from the image pickup device (e.g., the mage pickup device C) to the work machine 40 may be estimated based on the pixel value. In the coordinate transformation, the position of each work machine 40 in the coordinate system of the image pickup device is recognized, and coordinate transformation factors (matrix or quaternion) representing the position and posture of the image pickup device in the real spatial coordinate system are used. The coordinate transformation factors are registered in the database 102, being associated with the identifiers of the image pickup devices (and thus the image identifiers).

When intercommunication is established between the remote operation device 20 (client) and the work machine 40, the identifiers of the remote operation device 20 (or its operator) and the work machine 40, and the real spatial position of the work machine 40 are associated and registered to the database 102. The real spatial position of each work machine 40 is determined using the GPS on the work machine 40 and, as needed, using a position determination device using an acceleration sensor. When the work machine 40 transmits the real spatial position or its time series to the work assist server 10, the real spatial position of the work machine 40 registered in the database 102 is updated. Hence, based on the identifier, the real spatial position of the connection-target work machine can be searched for or recognized from the database 102.

If the determination result is positive (FIG. 5/STEP 123, YES), the second assist processing element 122 sets a flag f to "1" (FIG. 5/STEP 124). If the determination result is negative (FIG. 5/STEP 123, NO), the second assist processing element 122 sets the flag f to "2" (FIG. 5/STEP 125).

Furthermore, whether or not the index i is equal to the total number N of the actual machine image Qi included in the work-site bird's-eye image is determined (FIG. 5/STEP 126). If the determination result is negative (FIG. 5/STEP 126, NO), the index i is increased by one (FIG. 5/STEP 127), and processing for determining whether or not the actual machine image Qi corresponds to the connection-target work machine is repeated (see FIG. 5/STEP 123).

If the determination result is positive (FIG. 5/STEP 126, YES), the second assist processing element 122 generates a second work environment image based on the work-site birds-eye image and the flag f (FIG. 5/STEP 128).

Figure 8:
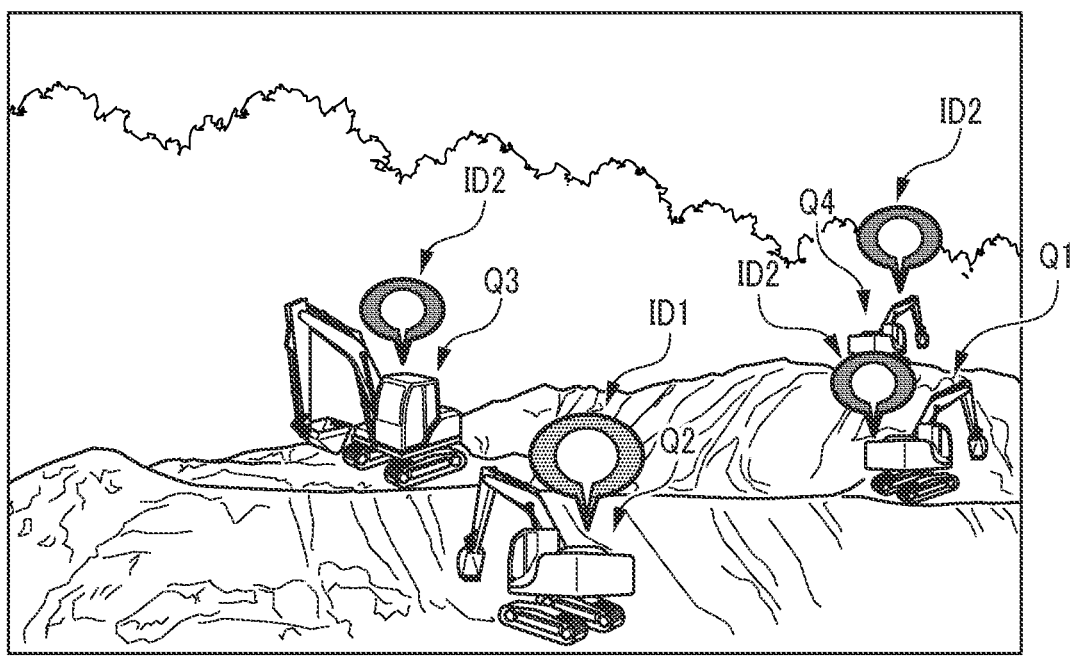
FIG. 8 is an illustration of one mode of a second work environment image.

To be specific, if there is an actual machine image Qi with the flag f set to "1" in the work-site bird's-eye image, a second work environment image containing a first sign image ID1 is generated. Accordingly, as shown in FIG. 8, for example, the second work environment image containing the first sign image ID1 in the form of a speech balloon that shows that the work machine 40 corresponding to the actual machine image Q2 in the work-site birds-eye image matches the connection-target work machine is generated. The speech balloon originates from the actual machine image Q2 or its vicinity. The combination of shape, color, and pattern of the first sign image ID1 may be changed as desired.

If there is an actual machine image Qi with the flag f set to "2" in the work-site bird's-eye image, a second work environment image containing second sign images ID2 is generated. Accordingly, as shown in FIG. 8, for example, the second work environment image containing the second sign images ID2 in the form of speech balloons that show each work machines 40 corresponding to the actual machine images Q1, Q3, and Q4 in the work-site bird's-eye image does not match the connection-target work machine is generated. The speech balloons originate from the actual machine images Q1, Q3, and Q4 or their vicinities. The combination of shape, color, and pattern of each second sign image ID2 may be changed as desired as long as it can be distinguished from the first sign image ID1. A second work environment image containing only the first sign image ID1 but no second sign images ID2 may also be generated. If it is determined that a work machine i matches a connection-target work machine (FIG. 5/STEP 123, YES), the determination processing in STEP 126 may be omitted and a second work environment image may be generated immediately (FIG. 5/STEP 128).

The second assist processing element 122 then sends data representing the second work environment image to the remote operation device 20 (FIG. 5/STEP 129).

When the remote operation device 20 receives the second work environment image data through the remote wireless communication unit 222 (FIG. 5/C22), the second work environment image is output through the image output device 221 that constitutes the remote output interface 220 (FIG. 5/STEP 214). Accordingly, as shown in FIG. 8, for example, a second work environment image containing a first sign image ID1 showing that the work machine 40 corresponding to the actual machine image Q2 is the connection-target work machine, and second sign images ID2 showing that the work machines 40 corresponding to the actual machine images Q1, Q3, and Q4 are the other work machines is output to the image output device 221.

(Effects)

In the work assist system and the work assist server 10 constituting the same with the aforementioned configuration, according to the captured image acquired through the image pickup device C, when a work machine 40 is in the work-site bird's-eye image (see FIG. 7) that is output on the remote output interface 220 constituting the remote operation device 20, whether or not the work machine 40 is a connection-target work machine is determined (see FIG. 5/STEP 121). If the determination result is positive, a first sign image ID1 associated with an actual machine image Q2 that represents the work machine 40 in the work-site birds-eye image is displayed on the remote output interface 220 of the remote operation device 20 (see FIG. 5/STEP 123, YES→ ... →STEP 128→STEP 129→C22→STEP 214 and FIG. 8).

If it is determined that work machines 40 in the work-site birds-eye image are not connection-target work machines, the second sign images ID2 associated with the actual machine images Q1, Q3, and Q4 representing these work machines 40 are output on the remote output interface 220 of the remote operation device 20 (see FIG. 5/STEP 123, NO→ ... →STEP 128→STEP 129→C22→STEP 214 and FIG. 8).

Consequently, the operator can easily recognize whether or not the work machines 40 or the actual machine images Qi in the work-site birds-eye image are subject to remote operation by the remote operation device 20. Thus, even if multiple work machines 40 are in the work-site bird's-eye image, for example (see FIG. 7), the operator can easily recognize which of the multiple work machines 40 is a connection-target work machine or whether none of them is a connection-target work machine.

If the first assist processing element 121 determines that some work machines 40 are not connection-target work machines, the second assist processing element 122 causes the remote output interface 220 of the remote operation device 20 to output, based on communication with the remote operation device 20, the second sign images ID2 showing that the work machines 40 are not connection-target work machines in such a manner that they can be distinguished from the first sign image ID1 (see FIG. 8).

Thus, if it is determined that the work machines 40 in the work-site bird's-eye image are not connection-target work machines, the second sign images ID2 associated with these work machines 40 are output on the remote output interface 220 of the remote operation device 20. Consequently, the operator can easily recognize that the work machines 40 displayed on the remote output interface 220 constituting the remote operation device 20 are not subject to remote operation by the remote operation device 20.

Other Embodiments of Invention

In the aforementioned embodiment, the work assist server 10 is one or more servers separate from each of remote operation devices 20 and work machines 40 (see FIG. 1); however, in another embodiment, the work assist server 10 may be a component of remote operation devices 20 or work machines 40. Each of the components 121 and 122 of the work assist server 10 may be a component of each of two or more devices selected from the remote operation devices 20 and work machines 40 that can communicate with each other.

When one of the work machines 40 determined to be a connection-target work machine by the first assist processing element 121 is in the work-site bird's-eye image, the greater the number of work machines 40 in the work-site bird's-eye image, the more the second assist processing element 122 may emphasize the first sign image ID1 output on the remote output interface 220 of the remote operation device 20.

In the work assist server 10 and the like with the aforementioned configuration, if one of the work machines 40 in the work-site bird's-eye image is a connection-target work machine, the greater the number of work machines 40 in the work-site birds-eye image, the more the first sign image ID1 is emphasized on the remote output interface 220 of the remote operation device 20. "Emphasize" is to make the output and display first sign image ID1 more eye-catching or visible by changing the shape, size, color (brightness, lightness, or saturation), or pattern, or any combination thereof, of the first sign image. This is because, in general, the greater the number of work machines 40 in the work-site bird's-eye image, the greater the likelihood that the operator will misidentify any of the other work machines 40 as a connection-target work machine. Accordingly, the operator can clearly recognize whether or not the work machines 40 contained in the work-site bird's-eye image are connection-target work machines.

When multiple work machines 40 including a connection-target work machine are shown in the work-site bird's-eye image, the smaller the distance between the connection-target work machine and other work machines in the work-site birds-eye image, the more the second assist processing element 122 may emphasize the first sign image ID1 on the remote output interface 220 of the remote operation device 20.

In the work assist server 10 and the like with the aforementioned configuration, when multiple work machines 40 including a connection-target work machine are shown in the work-site birds-eye image, the smaller the distance between the connection-target work machine and other work machines in the work-site birds-eye image, the more the first sign image ID1 is emphasized on the remote output interface 220 of the remote operation device 20. This is because the smaller the distance, the greater the likelihood that the operator will misidentify any of the other work machines 40 as a connection-target work machine. The distance of "0" means that the connection-target work machine and the other work machines 40 are overlapped in the work-site bird's-eye image. When multiple other work machines 40 are shown in the work-site bird's-eye image, the distance means the average distance or the shortest distance between the connection-target work machine and each of the multiple other work machines 40. Thus, the operator can clearly recognize whether or not a certain work machine 40 included in the work-site bird's-eye image is a connection-target work machine.

Even if the first assist processing element 121 determines that the work machine 40 is not a connection-target work machine (FIG. 5/STEP 123, NO), the second assist processing element 122 may generate a second work environment image that does not contain any second sign image ID2.

Figure 9:
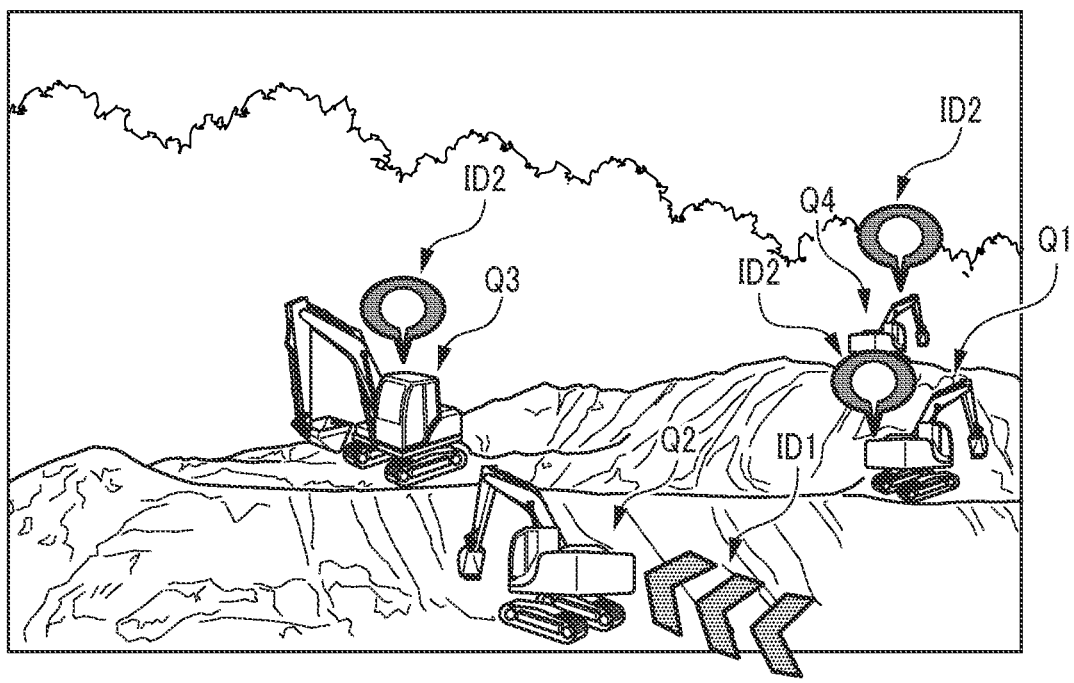
FIG. 9 is an illustration of another mode of the second work environment image.

The first assist processing element 121 may recognize a time series of at least the real spatial position or real spatial posture of the connection-target work machine, and the second assist processing element 122 may generate a second work environment image containing, as a first sign image ID, a trajectory image representing a time series of at least the real spatial position or real spatial posture of the connection-target work machine. Accordingly, for example, as shown in FIG. 9, a second work environment image containing, as a first sign image ID1, an arrow-shaped trajectory image showing the position trajectory or motion of the actual machine image Q2 or the corresponding work machine 40 is generated.

The second work environment image is then output to the remote output interface 220 of the remote operation device 20, and the first sign image ID allows the operator of the remote operation device 20 to recognize whether or not a certain work machine 40 in the work-site birds-eye image is a connection-target work machine, as well as a time series of at least the real spatial position or real spatial posture of the connection-target work machine. Consequently, for example, in consideration of consistency between the operator's operation mode of the remote operation device, and a time series of at least the real spatial position or real spatial posture of the connection-target work machine represented by the trajectory image serving as the first sign image ID1, the operator can recognize more clearly that the connection-target work machine is the work machine 40 that he or she is remotely operating.

Figure 10:
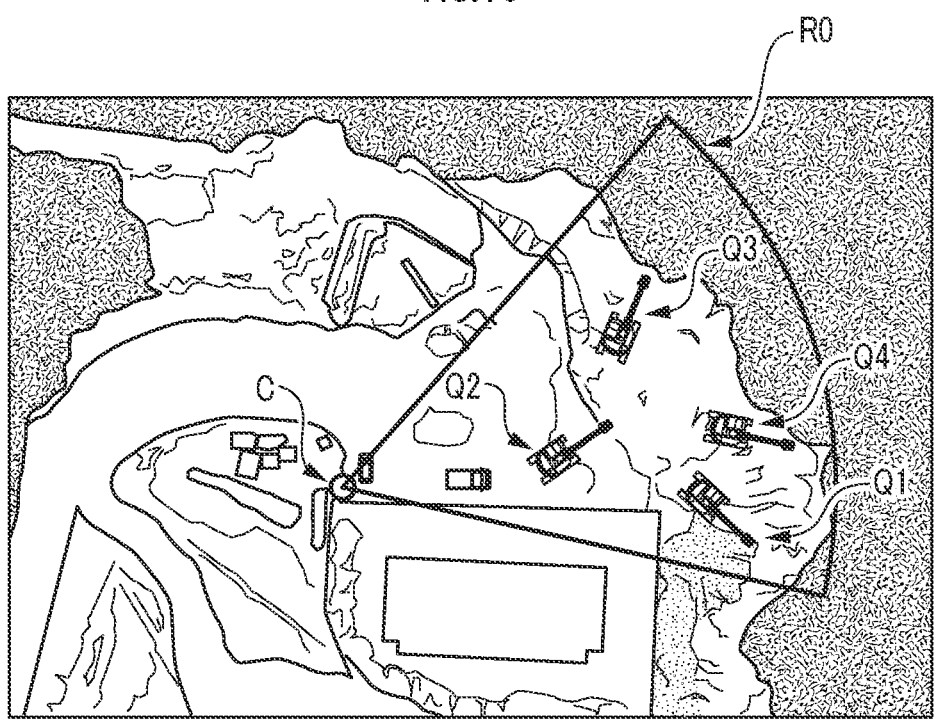
FIG. 10 is an illustration of another mode of the work-site bird's-eye image.

The second assist processing element 122 may cause the remote output interface 220 of the remote operation device 20 to output, based on communication with the remote operation device 20, a map or work-site birds-eye image showing the real spatial position of the work machine 40 and the real spatial position and angle of the image pickup device C. Accordingly, as shown in FIG. 10, for example, in addition to the actual machine image or icons Q1 to Q4 representing the work machines 40 existing at the work site, a captured birds-eye image or birds-eye map showing the real spatial position and angle R0 of the image pickup device C is output to the image output device 221. The captured birds eye image may be acquired, for example, through an image pickup device mounted on an unmanned aerial vehicle or an image pickup device installed on a pole or other structures at the work site. Each of the image capture location and angle of the captured image may be changed as desired. A birds-eye map may be generated based on the captured birds-eye image.

Accordingly, in consideration of the real spatial relative positions of the work machines shown in the work-site birds-eye image and the image pickup device that has acquired that work-site birds-eye image, the operator can check whether or not the perspectives of one or more work machines 40 in the work-site birds-eye image match (see FIG. 7). This allows the operator to recognize whether or not a certain work machine 40 on the remote output interface 220 is a connection-target work machine, as well as whether or not that work machine 40 is the work machine 40 shown on the map or the work-site birds-eye image.

The image output to the image output device 221 by the first designated operation may be a captured image acquired through an image pickup device (not shown in the drawing) installed at the work site or the actual machine image pickup device 412 mounted on a work machine 40 that is not connected to the remote operation device 20. In this case, if the determination result of the first designated operation through the remote input interface 210 by the operator is positive (FIG. 4/STEP 200, YES), a second work environment request is sent to the work assist server 10 through the remote wireless communication unit 222 (FIG. 5/SEEP 212), so that the second work environment image data is received through the remote wireless communication unit 222 (FIG. 5/C22), and the second work environment image is output through the image output device 221 constituting the output interface 220 (FIG. 5/STEP 214).

The image output device 221 may output multiple first work environment images and multiple second work environment images through right diagonally front image output device 2211, the front image output device 2212, and the left diagonally front image output device 2213, respectively, or in a split manner in each image output device. In this case, multiple captured images acquired through image pickup devices including the actual machine image pickup device 412 mounted on the work machine 40 connected to the remote operation device 20 are output to the image output device 221 by multiple first designated operations, respectively. In addition, multiple captured images acquired through image pickup devices (not shown in the drawing) installed at the work site or image pickup devices including the actual machine image pickup device 412 mounted on a work machine 40 that is not connected to the remote operation device 20 are output to the image output device 221 respectively by multiple second designated operations.

For the second work environment image output to the image output device 221, when there is the actual machine image Qi with the flag f set to "1" in the work-site bird's-eye image, only a first sign image ID1 is generated and second sign images ID2 do not have to be generated.

REFERENCE SIGNS LIST

10 . . . Work assist server, 20 . . . Remote operation device (client), 40 . . . Work machine, 102 . . . Database, 121 . . . First assist processing element, 122 . . . Second assist processing element, 210 . . . Remote input interface, 220 . . . Remote output interface, 410 . . . Actual machine input interface, 412 . . . Actual machine image pickup device, 420 . . . Actual machine output interface, 440 . . . Work attachment (working mechanism).

The invention claimed is:

1. A work assist system for assisting remote operation of a work machine by an operator using a remote operation device, including a plurality of the work machines existing in a worksite, a remote operation device having a function to remotely operate a connection-target work machine which is a work machine to be remotely operated among the plurality of the work machines, an image pickup device installed at the worksite, an actual machine image pickup device mounted on a work machine that is not the connection-target work machine among the plurality of the work machines, and a work assist server configured to mutually transmit data between the plurality of the work machines and the remote operation device and to acquire an work-site bird's-eye image representing a bird's-eye view of the worksite based on a captured image acquired through the image pickup device or the actual machine image pickup device, the work assist system comprising:

a database configured by the work assist server or a database server separate from the work assist server, and in a case where communication is established between the remote operation device and the connection-target work machine, the database registers identifiers of each of the remote operation device and the connection-target work machine and a real spatial position measured by a position determination device mounted on the connection-target work machine; and an output interface provided in the remote operation device and configured by an image output device capable to output an image based on communication with the work assist server, the work assist server comprises a first assist processing element and a second assist processing element, each composed of a processor, the first assist processing element acquires the work-site bird's-eye image based on the captured image acquired through the image pickup device or the actual machine image pickup device, performs image analysis processing on the acquired work-site bird's-eye image to determine whether or not there is a work machine captured in the work-site bird's-eye image, and when a work machine is in the work-site bird's-eye image, determines whether or not a calculated real spatial position of the work machine obtained by transforming from the position of the connection-target work machine in an image coordinate system in the work-site bird's-eye image into a real spatial coordinate system, and matches a measured real spatial position of the connection-target work machine registered in the database; and the second assist processing element, based on communication with the remote operation device, generates a second work environment image including a first sign image showing that the work machine in the work-site bird's-eye image is the connection-target work machine when the first assist processing element determines that the work machine is the connection-target work machine, by transmitting the second work environment image to the remote operation device, and causes the output interface to output the second work environment image, wherein the connection-target work machine is defined as the work machine to be actually remotely operated through the remote operation device.

2. The work assist system according to claim 1, wherein when a work machine that has been determined by the first assist processing element to be the connection-target work machine is in the work-site bird's-eye image, the greater the number of work machines in the work-site bird's-eye image, the more the second assist processing element emphasizes the first sign image output on the output interface of the remote operation device.

3. The work assist system according to claim 1, wherein when multiple work machines including the connection-target work machine are in the work-site bird's-eye image, the smaller the distance between the connection-target work machine and other work machines in the work-site bird's-eye image, the more the second assist processing element emphasizes the first sign image output on the output interface of the remote operation device.

4. The work assist system according to claim 1, wherein when the first assist processing element determines that the work machine is not the connection-target work machine, based on communication with the remote operation device, the second assist processing element causes the output interface of the remote operation device to output the second work environment image containing a second sign image showing that the work machine is not the connection-target work machine in such a manner that the second sign image can be distinguished from the first sign image.

5. The work assist system according to claim 1, wherein the first assist processing device recognizes a time series of at least the real spatial position or real spatial posture of the connection-target work machine based on the database, and the second assist processing element generates and causes the output interface of the remote operation device to output, based on communication with the remote operation device, the second work environment image containing a trajectory image representing the time series of at least the real spatial position or real spatial posture of the connection-target work machine recognized by the first assist processing element, as the first sign image.

6. The work assist system according to claim 1, wherein the second assist processing element causes the output interface of the remote operation device to output, based on communication with the remote operation device, a map or the work-site bird's-eye image showing the real spatial position of the work machine and the real spatial position and angle of the image pickup device.

7. A work assist server for assisting remote operation of a work machine by an operator using a remote operation device, the work assist server comprising:

a first assist processing element that causes an output interface of the remote operation device to output, based on communication with the remote operation device, a work-site bird's-eye image according to an image captured at a worksite acquired through an image pickup device, recognizes a real spatial position of a connection-target work machine, and when a work machine is in the work-site bird's-eye image, determines whether or not a calculated real spatial position of the work machine, obtained by transforming from the position of the connection-target work machine in the image coordinate system into a real spatial coordinate system, matches a measured real spatial position of the connection-target work machine; and a second assist processing element that causes the output interface of the remote operation device to output, based on communication with the remote operation device, a first sign image showing that the work machine in the work-site bird's-eye image is the connection-target work machine when the first assist processing element determines that the work machine is the connection-target work machine, wherein the connection-target work machine is defined as the work machine to be actually remotely operated through the remote operation device.

8. A work assist method for assisting remote operation of a work machine by an operator using a remote operation device, the work assist method comprising:

first assist processing for causing an output interface of the remote operation device to output, based on communication with the remote operation device, a work-site bird's-eye image according to an image captured at a worksite acquired through an image pickup device, recognizing a real spatial position of a connection-target work machine as the work machine to be subject to operation through the remote operation device, and when a work machine is in the work-site bird's-eye image, determining whether or not a calculated real spatial position of the work machine, obtained by transforming from the position of the connection-target work machine in the image coordinate system into a real spatial coordinate system, matches a measured real spatial position of the connection-target work machine; and second assist processing for causing the output interface of the remote operation device to output, based on communication with the remote operation device, a first sign image showing that the work machine in the work-site bird's-eye image is the connection-target work machine when the first assist processing determines that the work machine is the connection-target work machine, wherein the connection-target work machine is defined as the work machine to be actually remotely operated through the remote operation device.

\* \* \* \* \*